United States Patent [19]

Vineis

[11] Patent Number: 4,940,149
[45] Date of Patent: Jul. 10, 1990

[54] BUILDING ASSEMBLY SYSTEM

[76] Inventor: Donna L. Vineis, 1042 Welsh Rd., Landsdale, Pa. 19446

[21] Appl. No.: 219,259

[22] Filed: Jul. 15, 1988

[51] Int. Cl.⁵ ................................................ A47F 5/00
[52] U.S. Cl. .................................. 211/186; 211/189;
5/131; 403/295; 403/403
[58] Field of Search ............... 211/189, 186, 182, 183;
312/140; 403/292, 295, 403, 379, 378; 5/131, 185

[56] References Cited

U.S. PATENT DOCUMENTS

| | | | |
|---|---|---|---|
| 1,734,218 | 11/1929 | Lenox | 5/131 X |
| 3,118,543 | 1/1964 | Dresdner | 211/182 X |
| 3,468,430 | 9/1969 | Lawman | 211/182 |
| 3,606,023 | 9/1971 | Edmunds | 211/74 |
| 3,747,885 | 7/1973 | Ciancimino | 211/182 X |
| 3,837,754 | 9/1974 | Malcik | 211/189 X |
| 3,858,989 | 1/1975 | Field | 403/295 X |
| 4,403,886 | 9/1983 | Haeusler | 211/189 X |

Primary Examiner—Robert W. Gibson, Jr.
Attorney, Agent, or Firm—Joseph W. Molasky & Assocs.

[57] ABSTRACT

An assembly system comprised of core pieces which may be joined to create furniture and accessories of a funtional and decorative nature. The core pieces are structured in such manner as to enable the assembler to create a variety of imaginatve units which may be joined via a locking mechanism and disassembled or modified easily with common tools and a minimum of effort.

36 Claims, 5 Drawing Sheets

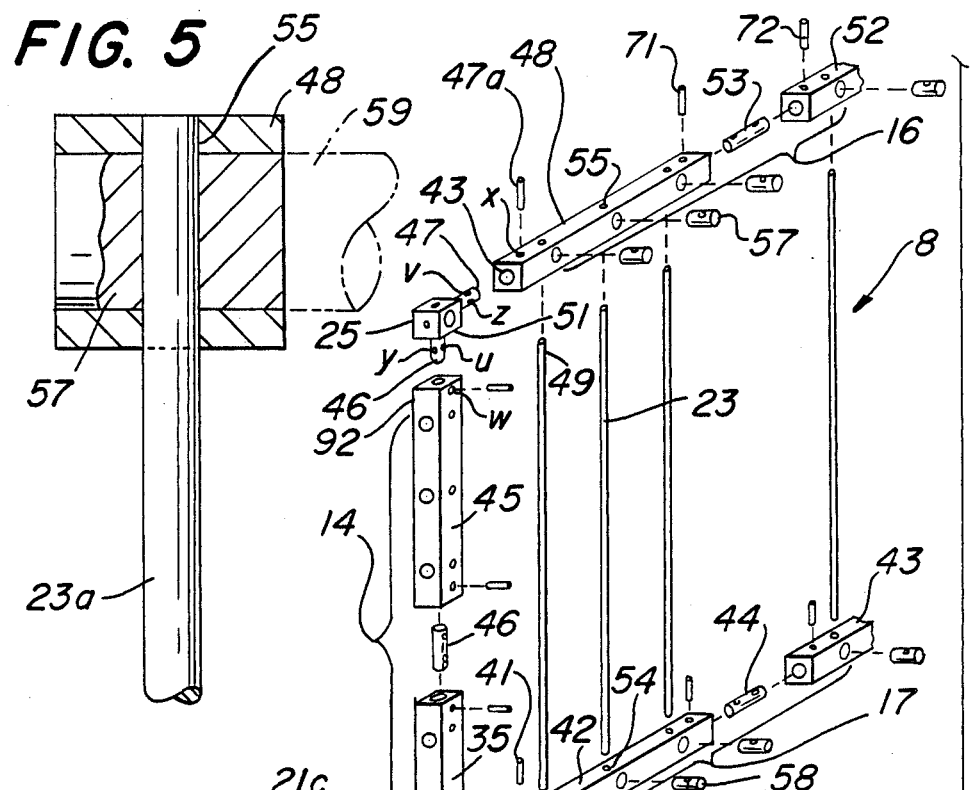
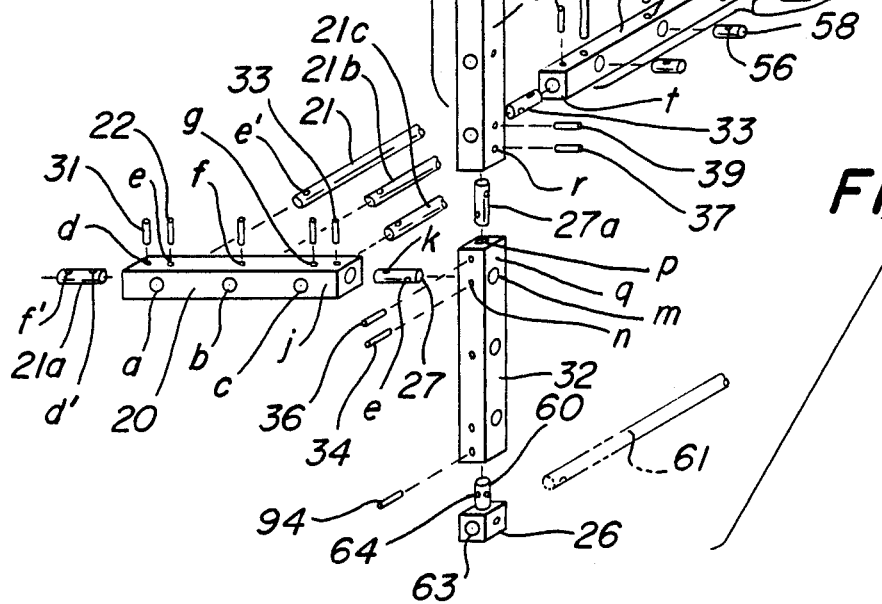

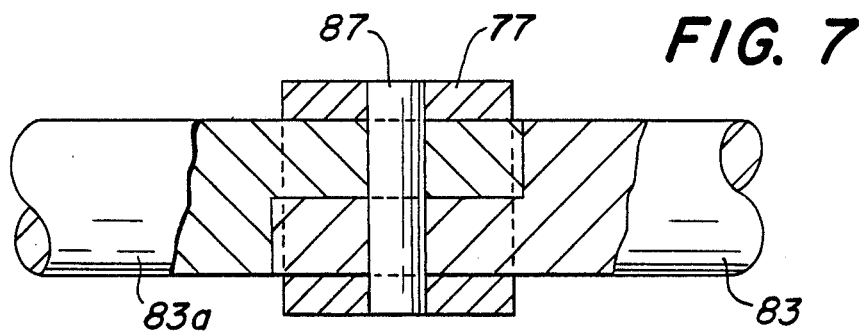
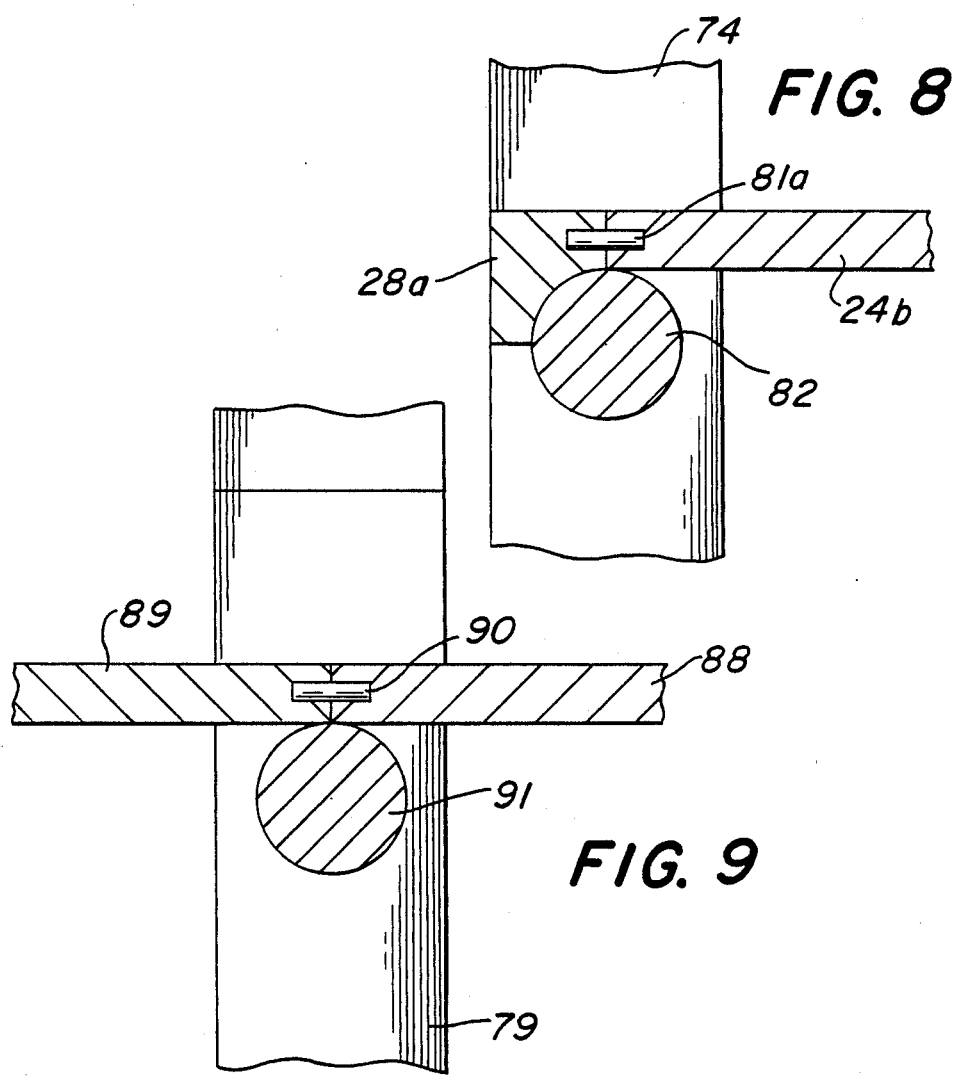

1

BUILDING ASSEMBLY SYSTEM

BACKGROUND OF THE INVENTION

This invention relates to an assembly and system in which a plurality of pieces are equipped with means for constructing useful and attractive furniture units.

DESCRIPTION OF THE PRIOR ART

The cost of furnishing a home has created a market for unfinished furniture, that is, furniture purchased in an assembled mode but requiring some finishing step such as a coat of paint, stain or the like. However, costs associated with unfinished furniture have risen so dramatically in recent years that consumers have taken to purchasing furniture in kit form, that is, furniture in the form of pre-cut pieces which must be assembled according to instructions.

These alternatives have served a useful purpose but their cost saving benefits have been short-lived and the influx of new families into the home-buying market has created a demand for even more economical options including furniture which can be modified to meet changing needs or to complement a new lifestyle. Furniture of this type must be adaptable and provide the user with means for creating alterable assemblies and decorative accessories which can be constructed on an as-needed basis to suit the environment in which they are employed.

Equally important is the need for furniture which can be disassembled easily to create usable space and provide means for storing and transporting same in a convenient manner.

A typical reconstruction may include, for example, a baby crib which, after it has served its purpose, may be disassembled and converted into a child's desk or high chair. The advantages of such a system are obvious and should have appeal to those for whom cost is of paramount importance.

Also, there is a need for a system that allows designers to create decorative prototypes to serve as inexpensive models for assemblies which have yet to be manufactured.

Therefore, it is an object of the present invention to provide a new and improved system for constructing furniture and decorative assemblies which are economical to produce, simple to erect and capable of being modified or adapted to a new use with a modicum of effort.

It is a further object to provide designers with a new and improved means for assembling prototypes which may serve as a model or standard for the construction of units which are to be mass produced.

SUMMARY OF THE INVENTION

A plurality of core pieces of various shapes and sizes are provided consisting essentially of main rectangular pieces and transitional, corner, flat, directional changing, locking and decorative pieces to enable a useful assemblage to be built. The system is designed to enable chairs, desks or book shelves and other utilitarian and decorative devices to be fabricated by an assembler for purposes of economy, or for designers to evaluate prototypes for possible future manufacture. The included pieces are sufficiently different and varied to allow many items to be designed as determined by the imagination of the assembler. A locking member is also provided in each core piece so that any two such pieces can be semi-permanently joined to one another to provide a stable and integral unit; on the other hand, the locking mechanism can be easily removed to separate previously joined pieces. The system is readily adaptable to either furnish sufficient core pieces to enable a single item such as a bookcase to be built, or alternatively, sufficient pieces can be furnished to build a variety of items.

BRIEF DESCRIPTION OF THE DRAWINGS

FIG. 2 is an exploded view of a portion of the assembled bed of FIG. 1 and showing the component pieces of the invention.

FIG. 5 is a sectional view of the three part assembly comprising a main piece combined with a male coupling member and piece.

FIG. 7 is a sectional view of FIG. 6 along line 7—7 and depicting another manner of combining two male coupling members in combination with a vertically oriented locking piece.

FIG. 8 is a sectional view of FIG. 6 along line 8—8 and illustrating the assembly of a finishing piece attached to the edge of a flat rectangular member.

FIG. 9 is a sectional view showing how two juxtaposed flat rectangular pieces are joined to one another.

DESCRIPTION OF THE PREFERRED EMBODIMENTS

Figure 1:
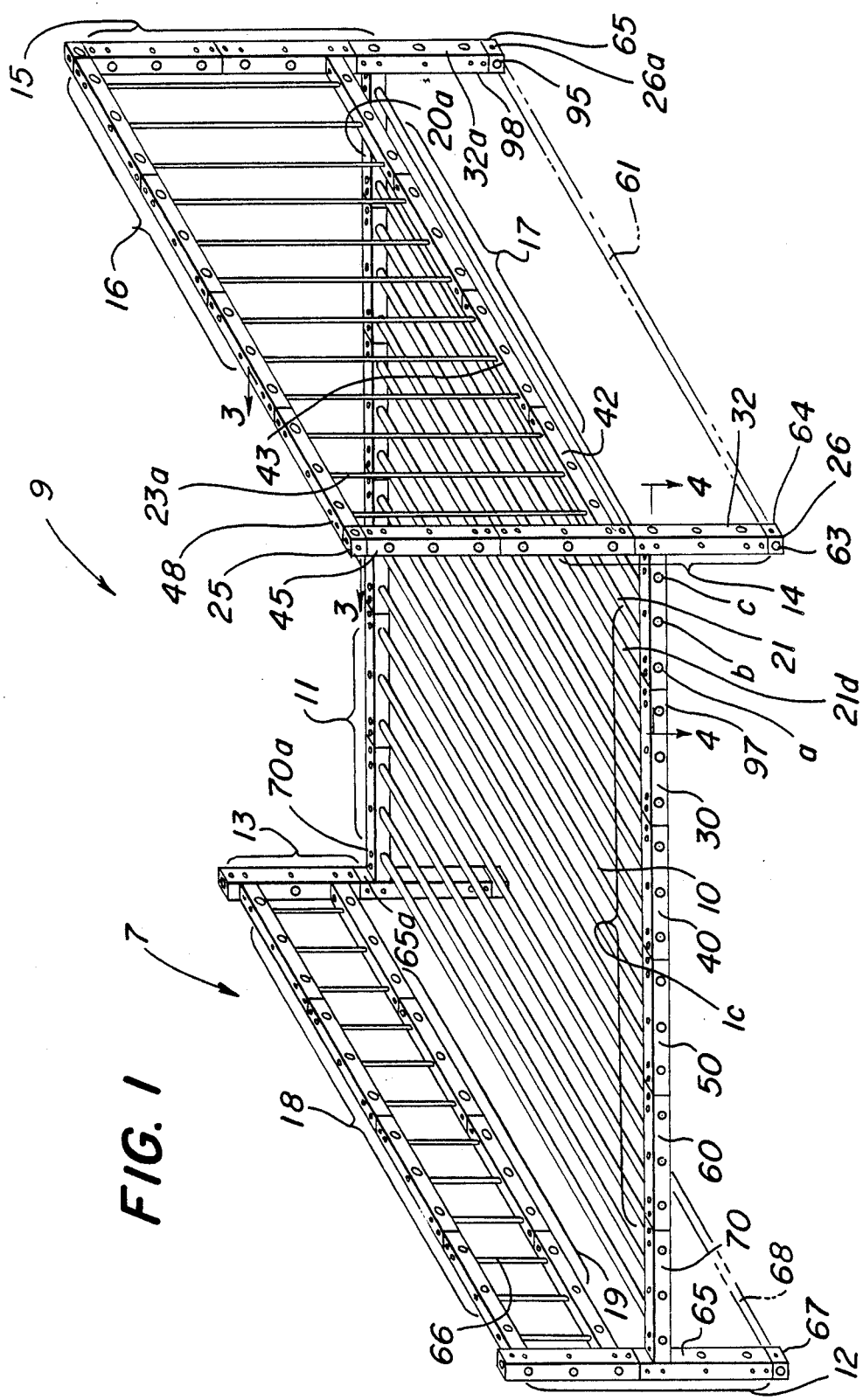
FIG. 1 is an isometric view of an assembled bed utilizing a plurality of different core pieces of which the invention is comprised.
Figure 6:
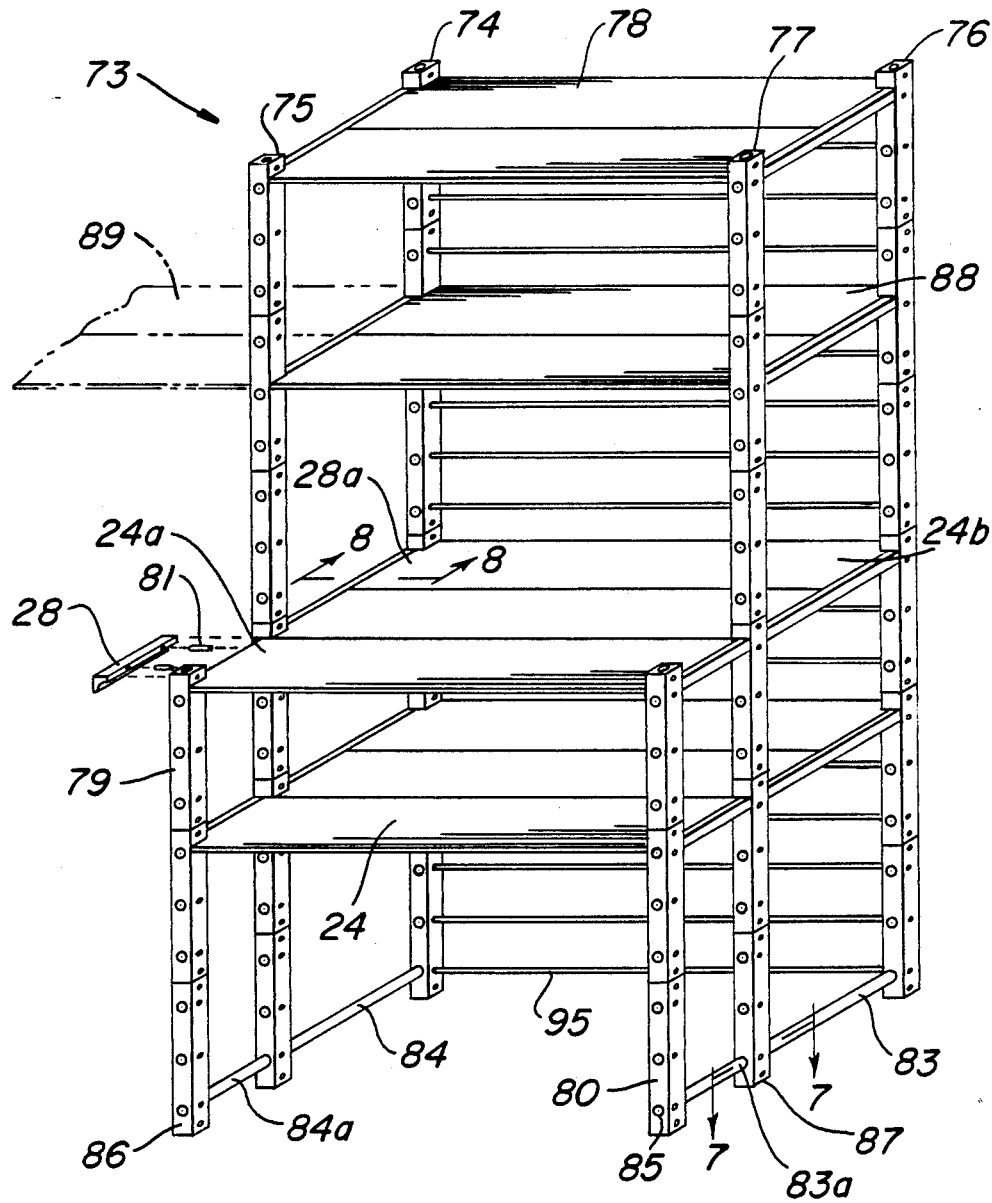
FIG. 6 is an isometric view of a desk with storage shelving utilizing a plurality of additional core pieces to those shown in FIGS. 1-5.

The building assembly system of this invention, which may be arranged in kit form, is formed from essentially nine core pieces which may be variously joined together to form furniture or decorative items. The assembly is particularly versatile in view of the ease with which these core pieces may be joined together to construct, for example, a baby crib or playpen, and after a period of use these items may be disassembled and reassembled into a baby stool or other useful item. The core pieces 20, 21, 21a, 22, 23a, 24, 25, 26, 27a and 28 are incorporated into a bed 9 and a desk-bookcase 73 embodiments as seen in FIGS. 1, 6 and some are illustrated in the partially exploded view of FIG. 2. The core piece 20 is a rectangular block member which is essentially an elongated piece of wood or other equivalent material which is one foot in length with a one and one-half inch square cross section; in addition, the main surfaces of the block member 20 are rectangular in shape with dimensions of one and one-half inches by twelve inches. Three one inch holes a, b, c are formed through opposite facing rectangular surfaces of the member 20 such that the two end holes a, c having centerlines which are two inches from either end. The middle hole b has a centerline which is four inches from the respective centerlines of holes a, c. A one inch hole j is provided at each end of the rectangular member 20 for coupling two rectangular members to one another as will become apparent hereinbelow. Orthogonally positioned with respect to each of the holes a, b and c are one-quarter inch holes e, f and g located through two of the remaining opposite facing rectangular surfaces, and additional one-quarter inch holes d, h are provided three-quarters of an inch from each end.

The holes a, b, c in the typical rectangular block member 20 are adapted to receive and mate with another core piece comprising a one-inch diameter dowel which in the bed assembly of FIG. 2 consists of a cross-coupling connecting dowel 21 positioned in the hole a. The cross-connecting dowel 21 is also located in the corresponding oppositely facing hole of a rectangular member 20a as seen in FIG. 1. The length of dowel 21 is, of course, designed for a particular application and in the embodiment of FIG. 1 is determined by the desired bed size and in accordance with whether a single, double, queen or king size is to be provided. A locking dowel 22, which is another core piece of this invention, is placed into an opening e after the dowel 21 is mated with the opening a. The dowel 22 upon positioning within hole e will semi-permanently mate the dowel 21 to the rectangular member 20. A plurality of such coupling dowels located within the various holes associated with certain rectangular core pieces provide a base support for a bed mattress (not shown) as is conventionally required. A core piece in the form of a connecting or coupling dowel 21a is also provided for mating with the end hole (not shown) in the member 20 and an identical end hole (not shown) formed in an adjacent rectangular member 30 (see FIG. 1). The member 30 is semi-permanently joined to the member 20 by allowing hole d to align itself with hole d' as well as by aligning hole f' with hole 97 in the member 30 so that locking pin 31 as well as a second locking pin (not shown) may be positioned within the aligned holes. By combining consecutive members 20, 30, 40, 50, 60 and 70 to one another a horizontal linear formation 10 is constructed which is utilized in the formation of the bed 9 in FIG. 1.

A directional dowel 27 is another core piece provided by this invention whose coupling function is shown in FIG. 2. The dowel 27 has a diameter of one inch and incorporates a one-quarter inch hole k at one end with a second hole l located at a forty-five degree angle from hole k. Holes k, l are formed at a distance of three-quarters of an inch from each end. The dowel 27 is utilized to enable a right angled transition or horizontal to vertical orientation to occur as from rectangular member 20 to rectangular member 32. The dowel 27 is depicted as being mated with holes j, m in respective blocks 20, 32 and are locked into position via the holes k, l which are respectively aligned with holes h, n. This arrangement is fixedly joined in a semi-permanent manner when locking pins 33, 34 are located in holes h, n after the coupling dowel 27 is placed in position. The joining of the rectangular members 20, 30 and the further joining of the member 20 to the vertically oriented rectangular member 32 is shown in cross section by referencing the sectional view of FIG. 4. The sectional view illustrates how the rectangular member 20 is coupled to the rectangular member 30 via the one inch diameter and three inch in length connecting dowel 21a. As can be readily seen the connecting dowel 21a is of a length that it butts against but does not interfere with adjacent cross-connecting dowels 21, 21d. The members 20, 30 are semi-permanently mated to one another by means of the locking dowels 31, 31a.

Figure 4:
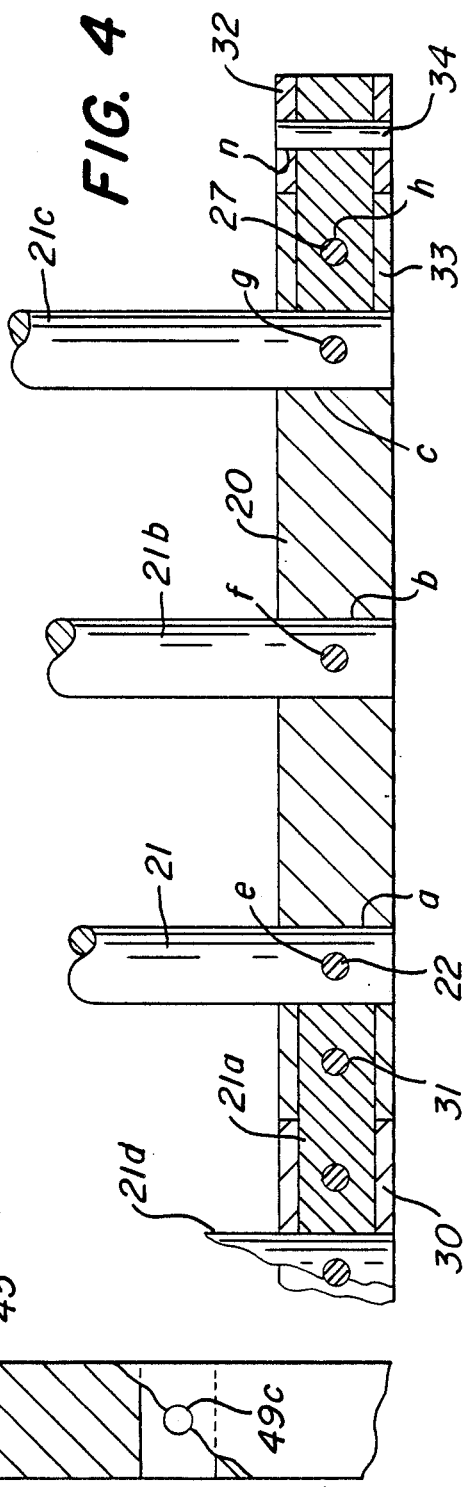
FIG. 4 a sectional view of FIG. 1 along line 4—4 and illustrating the component assembly along the rail support section of the bed.

The cross-connecting dowels 21, 21b, 21c which provide a portion of the mattress support are also shown in FIG. 4 as being mated with the respective holes a, b, c formed in the rectangular member 20 and as further seen in FIGS. 1 and 2. FIG. 4 further illustrates the directional dowel 27 joining together the horizontally oriented block member 20 with the vertically oriented block member 32 and the cross-connecting dowel 21c butting against the directional dowel. The rectangular members 20, 32 are semi-permanently joined to one another by placing the locking pins 33, 34 in respective openings h, n as hereinbefore discussed.

Returning to FIG. 2 of the Drawings, the rectangular members 32, 35 are joined to one another by way of a directional dowel 27a, a core piece of this invention, which allows member 35 to be rotated ninety degrees with respect to member 32 even though both are positioned in the same vertical plane. The directional dowel 27a is fixed in position by means of locking pins 35, 37 which mate with respective holes p, r in order to semi-permanently join members 32, 35 to one another. It is therefore apparent that the directional dowel 27a allows rectangular member 32 to become an initial member for forming a linear formation 14 which provides a first vertical post for constructing the headboard 8 of the bed 9; similarly, the directional dowel 27a allows member 35 to be properly rotated to allow the linear horizontal section 17 to be formed (see FIG. 1) for constructing the headboard 8. The attachment of rectangular block 45 to block 35 by means of coupling dowel 46 completes the formation of linear section 14. The formation of the linear horizontal section 17 of headboard 8 is initiated by connecting the rectangular block member 42 with the block member 35 via the directional dowel 38 which mates with the holes s, t and is semi-permanently locked into position by means of respective pins 39, 41. The complete horizontal section 17 is formed by joining a plurality of members such as members 42, 43 by means of coupling dowel 44.

Another core piece 25 is provided by this invention for permitting the vertical linear section 14 to be attached to the horizontal linear section 16. The corner piece 25 is a one and one-half inch cube having one inch diameter dowels 46, 47 with a one and one-half length which are formed on two adjacent faces. Each respective dowel 46, 47 has formed therein one-quarter inch holes y, u and v, f at three-quarters of an inch from the end. The corner piece 25 allows two rectangular members 45, 48 to be connected to one another at a forty-five degree angle by way of the dowels 46, 47. The holes u, v are located in respective dowels 46, 47 in order to become aligned with holes w, x. The holes y, z, which are arranged ninety degrees from the respective holes u, v are provided when there is a different orientation of the particular rectangular members that are to be joined. In the manner previously described, the corner piece 25 is locked into position by means of the pins 49, 49a to provide the semi-permanent joining of members 45, 48. A one inch hole 51 for mating with a one inch coupling or directional dowel is formed through two opposite faces of the corner piece 25, but is not utilized in the embodiment of FIG. 2.

Figure 3:
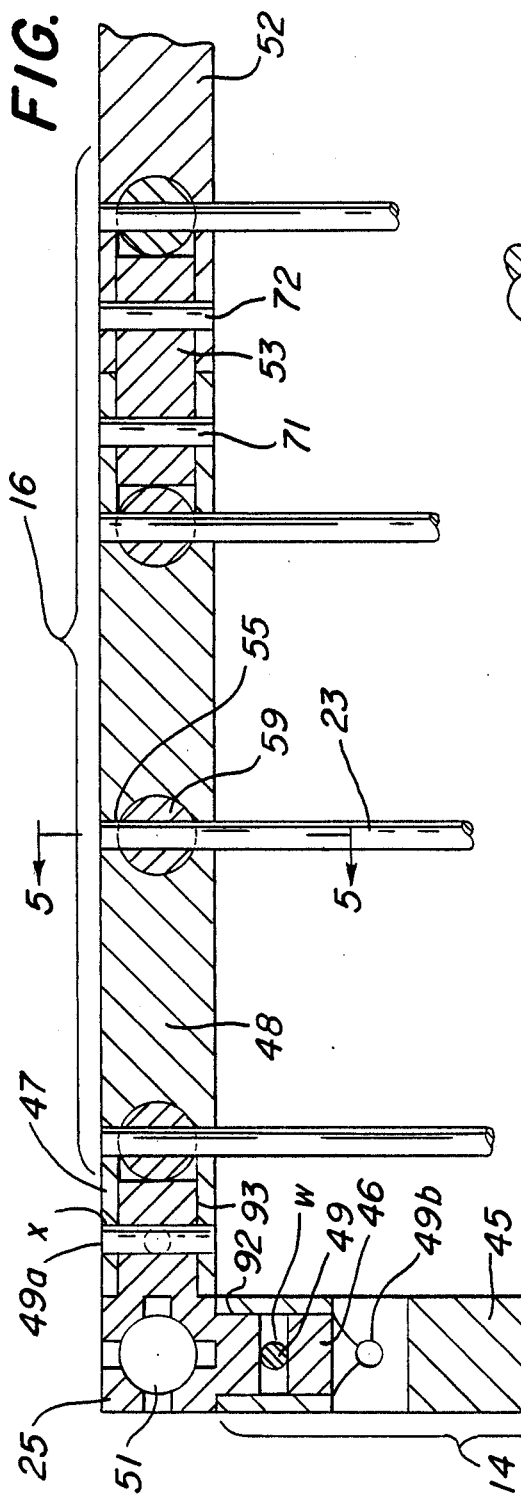
FIG. 3 is a sectional view of FIG. 1 along line 3—3 depicting the component assembly along the corner of the headboard the bed.

FIG. 3 clearly depicts in section the inter-relationship of the core piece 25 with rectangular members 45, 48, which are utilized to construct a portion of the linear sections 14, 16 of the headboard 8 (see FIG. 1). The vertically oriented rectangular member 45 of the linear section 14 is joined to the rectangular member 48 of linear section 16 by mating the respective dowels 46, 47 with end holes 92, 93. The corner piece 25 is semi-permanently joined to members 45, 48 by means of locking pins 49, 49a respectively positioned in openings w, x. An additional rectangular member 52 of the linear section 16 is also semi-permanently joined to the rectangular member 48 via the connecting dowel 53 which mates with corresponding end holes; and as understood, the dowel 53 is locked into position by orthogonally located pins 71, 72 as may also be viewed in FIG. 2. In order to provide rigidity as well as decorative background to the construction of the headboard 8, the cross-connecting locking dowel 23a is mated in the hole 55 at one end and in another hole 54 formed within rectangular member 42 (see FIG. 2). The cross-connecting locking dowel 23a is further designed to mate with corresponding holes 56, 57 in dowel plugs 58, 59. The sectional view of FIG. 5 depicts the mating between the cross-connecting locking dowel 23a located within the opening 55 of member 48 and opening 57 of plug 59. The dowel plugs 58, 59 are intended to fill the various openings formed in the rectangular faces of the members 42, 48 in order to enhance the appearance of headboard 8; in addition, the holes 56, 57 of respective plugs 58, 59 provides additional support for the mating of dowel 23a with corresponding holes in members 42, 48.

Another core member of the system and kit assembly provided by the present invention is the directional piece 26 which is connected to the rectangular member 32 in FIG. 2. The core piece 26 is formed from a one and one-half inch cube upon which a one inch dowel 62 is formed with a length of one and one-half inch. A hole 63 is formed through two of the cubic faces which are perpendicular to the dowel 62 and is adapted to mate with an end of the connecting dowel 61; the dowel 61 is also designed for mating with hole 95 provided in the directional piece 65. In the manner previously described, the dowel 62 of piece 26 is fixed at one end to the rectangular member 32 of the vertical linear section 14 by means of locking pin 94 which mates with the one-quarter inch hole 64; and, at the other end the directional piece 26a is locked to the rectangular member 32a by a locking pin (not shown) which is positioned in hole 98 (see FIG. 1). The dowel 61 when locked into the directional pieces 26, 26a provides further rigidity and support for the head board 8.

The footboard 7 is shown in FIG. 1 as being essentially comprised of the linear horizontal formations 18, 19 and the vertical linear formations 12, 13. In a manner previously described, the vertical linear formations 12, 13 are constructed in the same manner as vertical formations 14, 15 of the headboard 8 and are joined to the horizontal formations 10, 11 by means of directional dowels (not shown) mated and locked to end holes (not shown) in respective rectangular members 65, 70 and 65, 70a. As understood, the horizontal linear members 18, 19 are similarly joined to one another by means of coupling dowels (not shown) in the same manner as described with respect to linear formations 16, 17 of the headboard 8. Additional support is furnished to the construction of the footboard 7 by means of the one-quarter inch diameter dowel 66 which is mated with corresponding holes in oppositely positioned rectangular members; additional support for the footboard 7 is achieved by means of one inch diameter dowel 68 which interconnects directional piece 67 with an oppositely positioned directional piece located at the bottom of vertical formation 13. Therefore, it can be readily appreciated that various core pieces provided by the present invention and described above allows furniture in the form of a bed 8 to be easily constructed by self-assembly. It may be further appreciated that the bed 8 may be in kit form by furnishing all of the component parts for assembly in a facile and economical manner.

There is shown in FIG. 6 a desk-bookcase combination 73 which utilizes some of the core pieces discussed with respect to FIGS. 1-5 and further employs core pieces 24, 28 whose function will be discussed in detail hereinbelow. The desk-bookcase 73 is essentially comprised of the four linear vertical formations 74, 75, 76, 77 which are spaced with respect to one another in order to receive appropriate double shelving 78 and in addition, two shorter linear vertical formations 79, 80 are provided which are attached to the linear formations 75, 77. The formations 74-77 and 79, 80 are obtained in the manner previously described with respect to FIGS. 1-5. The shelving 78 is comprised of a core flat piece 24 which is appropriately joined to another such piece. In a typical embodiment, the single shelf piece 24 consists of a one inch thick flat board measuring two feet in width and four feet in length; in addition, a square measuring one and one-half inches by one and one-half inches is removed from two adjacent corners along its longest dimension in order to allow positioning around the vertical members 79, 80. Located around the four sides of the shelf core piece 24 at two inch intervals are one-quarter inch holes (not shown) and having a depth of one inch. The holes are employed to receive short coupling dowels 81 for attaching another core piece referred to as a finishing edge 28 to the shelf 24a. This arrangement is clearly seen by referring to the sectional view of FIG. 8 wherein the finishing edge 28a is shown attached to the shelf 24b. As can be readily appreciated the shelf 24b is attached to the finishing edge 28a by means of the one-quarter inch coupling dowel 81a; furthermore, the finishing edge 28a is shaped in such a manner that it fits around the one inch support dowel 82 which is provided to interconnect the vertical linear formations 74, 75 (see FIG. 6). As understood, finishing ends (not shown) are attached to other appropriate sides of the shelving in order to provide a professional appearance for the desk-bookcase 73.

The desk-bookcase 73 is easily expandable to a larger version by means of the structural expedients provided by this invention. This is shown by way of example in FIG. 6 where the shelving 88 is expandable by furnishing additional shelving 89 shown in phantom. In this embodiment, the shelving 89 is added to shelving 88 by use of the one-quarter inch dowels 90 (see FIG. 9) in openings (not shown) provided along their edges; further, at the junction between the ends of the shelving 88, 89 a coupling dowel 91 is provided for support purposes between linear formations 74, 75. This shelf enlargement requires additional vertically oriented linear formations (not shown) to provide an additional support for the suspended portion of shelf 89 shown in FIG. 6.

The desk portion of the desk-bookcase 73 is furnished by shelves 24, 24a which are located between the vertical linear formations 79, 80 and the longer vertical linear formations 75, 77. The shelf 24a is used in this arrangement as a writing surface whereas the shelf 24 may be employed to store books. The bookcase of the desk-bookcase 73 is attached to the desk portion and is essentially formed by means of two shelf core pieces 24 to form shelving 78, as previously mentioned.

In order to provide structural support and rigidity to the desk-bookcase 73, one inch diameter coupling dowels 83, 83a, 84, 84a are provided through openings 85, 86 in the lower portion of the vertical linear formations 74–77 and 79, 80. This coupling arrangement is obtained by mating two coupling dowels 83, 83a and 84, 84a within the vertical formations 77, 75 as may be clearly seen in the sectional view of FIG. 7. FIG. 7 illustrates how the coupling dowel 83a is cut with respect to the coupling dowel 83 to provide a lap joint which is joined and contained within the linear formation 77. The lap joint is rigidly maintained within the formation 77 by means of the locking pin 87. It should be understood that instead of using two-piece coupling dowels 83, 83a the use of a single dowel through the three vertical formations 76, 77 and 80 is also feasible. Additional structural support in the form of locking dowels 95 which connect vertical formations 74, 76 are also provided in the desk-bookcase 73; in addition, the dowels 95 also provide a decorative background for the desk-bookcase.

The desk-bookcase 73 of FIG. 6 is also obtained by the present invention by the use of a plurality of core pieces as in the manner of the bed 9 shown and described in FIGS. 1–5. The desk-bookcase embodiment is also readily provided in kit form for easy assembly with certain modifications such as by appropriately modifying the length of the coupling dowels 83, 84 as well as the locking dowels 95. Accordingly, by imaginative employment of the various core pieces many different utilitarian or decorative structures may be built.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. A kit for assembling a plurality of pieces into an article of manufacture comprising:
   (a) a plurality of rectangular block members wherein each provides a first opening formed at either end as well as a plurality of openings through two of its rectangular faces, and wherein opposite and through each first opening a second opening is orthogonally formed;
   (b) a first square block member having a male extension formed upon two adjacent faces for respectively mating with said first openings formed on the ends of two said rectangular members, and each said extension including a second orthogonally formed opening, said first square block member providing a means for joining together two rectangular members at right angles with respect to one another;
   (c) a second square block member having a single male extension formed upon one of its faces for mating with one said first openings at the end of a rectangular block member wherein said single extension includes a second orthogonally formed opening and said second block member providing a means for joining with one said end location of a single rectangular block member; and
   (d) first, second and third connecting means wherein said first connecting means is adapted to mate with any two first openings for joining respective rectangular block members to one another in a linear or alternatively, angular formation, said second connecting means being adapted to mate with any two openings formed through two of the rectangular faces for coupling said block members to one another, and said third connecting means adapted to mate with any said orthogonal openings for locking said joined and/or coupled rectangular members to one another;
   (e) a flat rectangular member having equal cut-outs located-on opposite ends of one of its largest dimensional sides and adapted to form a shelf between four linear formations of said rectangular block member.

2. A kit in accordance with claim 1 and further comprising:
   a decorative member for fitting around certain edges of said flat rectangular member.

3. The kit in accordance with claim 2 wherein said flat member includes a plurality of said second openings which are spaced around at least two, of said rectangular edges.

4. The kit in accordance with claim 2 and further comprising:
   a fourth connecting means for mating with respective and corresponding second openings for coupling two separated and aligned in parallel rectangular block members.

5. The kit in accordance with claim 4 and further comprising:
   a fifth connecting means adapted to mate with respective first openings formed in an end and rectangular face of said block members wherein said two rectangular members may be joined to one another at a ninety degree angle.

6. The kit in accordance with claim 5 and further comprising:
   a fifth connecting means adapted to mate with any of said first openings formed in said rectangular block members and having a single second opening formed therein for receiving a locking means.

7. The kit in accordance with claim 6 wherein said first, second, third, fourth and fifth connecting means comprises a dowel.

8. The kit in accordance with claim 1 wherein said first opening is located through said first square block member and is oriented perpendicularly to a plane through said respective male extensions.

9. The kit in accordance with claim 3 wherein said decorative members includes a plurality of said second openings corresponding to said flat member second openings for joining together by means of said third connecting means.

10. The kit in accordance with claim 3 wherein at least two said flat members may be joined to one another by means of said third connecting means which are inserted in holes provided in facing sides which are to be joined.

11. A kit in accordance with claim 1 wherein said rectangular block member further comprises:
   (a) four of said sides are rectangular and both ends are square and said one first opening being located in each end and a plurality of openings being located in said rectangular sides, and said second opening being located orthogonally and oppositely each first opening; and
   (b) said first opening being larger in diameter than said second opening.

12. A kit in accordance with claim 11 wherein said rectangular block member further comprises:
at least three equally spaced openings being located in said rectangular side of said member.

13. A kit in accordance with claim 1 wherein said first connecting means further comprises:
first and second passageways which are aligned in parallel with one another and adapted for receiving said locking means.

14. A kit in accordance with claim 1 wherein said first and second square block members further comprise additional second orthogonally formed second openings located in each said respective male extension and orthogonal thereto, said second openings being further separated from each other upon respective extensions by ninety degrees.

15. A kit in accordance with claim 5 wherein said fifth connecting means further comprises forming second openings located at either end which are separated from each other by ninety degrees.

16. A kit in accordance with claim 2 wherein said decorative member further comprises:
(a) a six-sided member wherein at least four of said sides are rectangles and two of said sides are square, and further, two adjacent of said rectangular sides having an equal area, and the remaining adjacent rectangular sides having an equal area but smaller than said first mentioned area;
(b) a curve formed intermediate said two rectangular side shaving equal but smaller areas; and
(c) a plurality of additional equally spaced second openings located along at least one side of said smaller area rectangle for receiving said second connecting means.

17. A furniture assembly formed from a plurality of pieces comprising:
(a) pairs of linear members having rectangular side and square end surfaces formed from a plurality of equal length rectangular block pieces which may be arranged in a vertical or alternatively horizontal direction; and each said block piece including first and second passageways formed in its rectangular and square surfaces wherein said second passageway is smaller than said first passageway and is formed orthogonally thereto;
(b) first means being located within said first passageways to couple two linear members to one another along their respective square surfaces;
(c) second means being located within said second passageways to lock said first means in place and/or alternatively to couple corresponding pieces of a linear pair to one another;
(d) a first said pair of said linear members being positioned oppositely from a second said pair wherein said first pair is longer than said second pair;
(e) a third equal length pair of linear members formed from a plurality of equal length rectangular block pieces which are horizontally arranged wherein one member of said third pair is connected to a member of said first and second pairs, and a second member of said third pair is connected to a second member of said first and second pair;
(f) a plurality of said first means located within oppositely facing first passageways of said pieces comprising said third pair of members for forming a flat surface; and positioning said second means orthogonal to said first means for locking said first means in place;
(g) fourth and fifth pairs of linear members formed from a plurality of equal length rectangular block pieces which are arranged in a horizontal direction and the individual pieces are separated from one another wherein said fourth pair of members are connected between the members of said longer first pair and said fifth pair of members is connected between said shorter members of said second pair wherein said fourth and fifth pairs provide a respective headboard and footboard; and
(h) means located between the separated members of said fourth and fifth pair and in opposite facing second passageways thereof for forming a bed assembly.

18. The furniture assembly in accordance with claim 17 wherein said equal length rectangular block pieces further comprise locating a plurality of equally spaced first passageways through two faces and locating said second passageway through two different faces and opposite and orthogonal each first passageway for locking and/or coupling purposes.

19. The furniture assembly in accordance with claim 18 and further comprising:
(a) means connected to an end of each said first and second pairs of vertically arranged linear members for resting upon a floor surface wherein each end connected means includes said first and second passageways, and
(b) said first means coupling said end connected means to one another to provide rigidity to said bed assembly.

20. The furniture assembly in accordance with claim 17 and further comprising:
means connected to an opposite end of each said first and second pairs of vertically arranged linear members wherein each said opposite end connect means includes said first and second passageways, and one of said linear members of said fourth pair of members being further connected to said opposite end connected means for allowing a transitional connection to be made for the construction of said headboard.

21. A furniture assembly in accordance with claim 17 and further comprising:
(a) a first said pair of said linear members being positioned oppositely from a second said pair wherein said first and second pairs are equal in length;
(b) said first means being located within directly opposite facing first passageways in corresponding rectangular block pieces of said first and second pairs, and wherein said first means location being variously spaced upon said linear members;
(c) flat means being positioned upon said first means and within the confines of said first and second pairs of members for forming a shelf; and
(d) said second means being located within directly opposite facing second passageways in a member comprising said first and second pairs for forming a back support for a storage stand.

22. A furniture assembly in accordance with claim 21 and further comprising:
means located on ends of said flat surfaces for providing a decorative edge.

23. A furniture assembly in accordance with claim 21 and further comprising:
(a) a third said pair of linear members and of shorter length than said first and second pairs and wherein said third pair is connected to said first and second pairs by means of variously positioned said first means which are located in oppositely facing first passageways;

(b) additional flat means being located upon said variously positioned first means for forming additional shelving for a stand or in the alternative, a desk.

24. An article of manufacture comprising:
(a) a six sided member wherein at least four of said sides are rectangles and two of said sides are squares;
(b) a circular opening located in each said square and rectangular sides for receiving a circular non-threaded dowel male coupling means and for providing face-to-face positioning of the six-sided member to one another;
(c) an aperture located in said rectangular sides and orthogonal to each said openings for receiving a non-threaded male locking means to maintain said male coupling means in place;
(d) said openings having a larger diameter than said aperture,
(e) at least two additional circular openings located adjacent to said first opening; and
(f) a respective aperture located oppositely and orthogonally to each said two additional openings for receiving a non-threaded locking means to maintain any male coupling means positioned in said openings in place.

25. The article of manufacture in accordance with claim 24 wherein said male coupling means comprises a first dowel having upper and lower passageways which are aligned in parallel for receiving said locking means.

26. The article of construction in accordance with claim 25 wherein said locking means comprises a second dowel whose diameter is smaller than said first dowel.

27. The article of manufacture in accordance with claim 25 wherein said upper and lower passageway of said dowel coupling means are aligned in the same plane.

28. An article of manufacture in accordance with claim 24 wherein said male coupling means comprises:
a dowel having upper and lower passageways which are orthogonally positioned with respect to one another.

29. An article of manufacture in accordance with claim 24 and further comprising:
(a) a six-sided member wherein six of the sides are square;
(b) male means extending from two adjacent faces of said member; and
(c) said six-sided square member providing a corner piece adapted to couple two six-sided rectangular members at right angles to one another by mating one of their square side openings with any one of said male extending means.

30. An article of manufacture in accordance with claim 29 and further comprising:
two passageways formed in each male extending means which are oriented ninety degrees from one another for receiving said locking means.

31. An article of manufacture in accordance with claim 29 and further comprising:
an additional opening formed in said six-sided square member which is orthogonal to said male extending means.

32. An article of manufacture in accordance with claim 31 and further comprising:
additional apertures located through respective sides of said six-sided square member which are orthogonal to said additional opening for receiving respective locking means.

33. An article of manufacture in accordance with claim 24 and further comprising:
(a) a six-sided member wherein six of the sides are square;
(b) a single male means extending from one of said four sides;
(c) said six-sided square member forming a directional piece adapted to couple with a six-sided rectangular member by mating with one of said square side openings.

34. An article of manufacture in accordance with claim 33 and further comprising:
(a) two passageways formed through said single male extending means which are located orthogonal to one another and for receiving a locking means;
(b) said six-sided rectangular member being semi-permanently joined to said six-sided square member with a single extending means by mating one of its square side openings; and
(c) locking means located through said aperture and one said passageway to provide a semi-permanent joining of six-sided rectangular member and six-sided square member having a single extending male means.

35. An article of manufacture in accordance with claim 34 and further comprising:
an additional opening located in said six-sided square member orthogonally to said male extending means and adapted to receive a male coupling means.

36. An article of manufacture in accordance with claim 14 and further comprising:
additional apertures located through respective sides of said six-sided member and orthogonal to said additional opening for receiving locking means.

* * * * *